May 31, 1949.  G. I. HOLMES  2,471,687

DYNAMIC DAMPER COUNTERBALANCE

Filed April 11, 1945

INVENTOR

Gifford I. Holmes

Patented May 31, 1949

2,471,687

UNITED STATES PATENT OFFICE 2,471,687

DYNAMIC DAMPER COUNTERBALANCE

Gifford I. Holmes, Manchester, Conn., assignor to United Aircraft Corporation, East Hartford, Conn., a corporation of Delaware Application April 11, 1945, Serial No. 587,720

11 Claims. (Cl. 170—160.57)

The present invention pertains to helicopters, and more particularly to means for counterbalancing and damping or absorbing the vibrations of a rotating machine element thereof, shown as a rotor in the specific embodiment disclosed herein as an example.

In a helicopter rotor blade, under different conditions of flight, vibration generating forces are encountered which tend to cause the rotor to lag and lead and to flap up and down in its path of rotation. If these forces become in phase with the natural vibration period of the blade, a dangerous vibration may occur. With a single bladed rotor, cyclic vibrations may occur for different speeds of the rotor and also for different degrees of coning if a fixed counterweight is used.

It is an object of this invention to provide mechanism for counterbalancing and damping the vibrations of a rotating part or parts of a machine.

Another object is to provide a counterbalancing damper structure which will damp different modes of vibration, or different vibrations, to the same or to different degrees.

Another object is to provide a counterbalancing damper structure for damping one or more vibrations with inertia, and a dynamic component of inertia to a greater or lesser extent, as desired.

A further object is to provide mechanism as set forth in the preceding objects of as little weight as possible consistent with safety and economy.

The foregoing and other objects will be either obvious or pointed out in the following specification and claims.

Although the structure is shown associated with a single rotor helicopter having the torque of the rotor compensated by a tail rotor, it will be understood that the invention to be described is applicable to all types of helicopters and also to other rotating machine elements.

Figure 1:
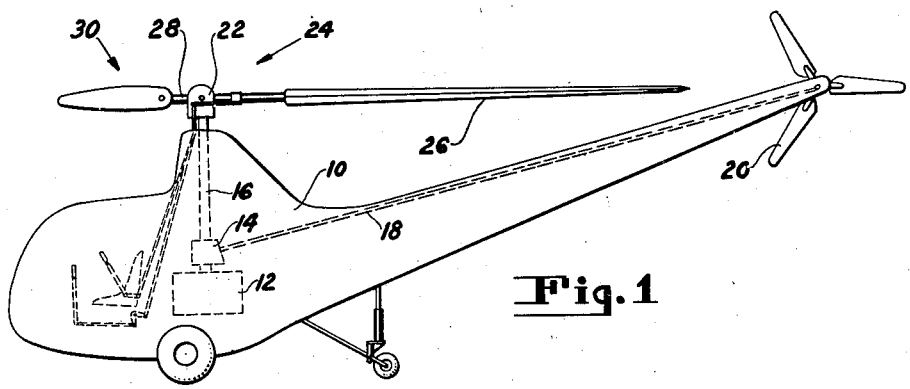
Fig. 1 is a diagrammatic view of my invention applied to a rotor of a helicopter.

In Fig. 1 a helicopter body 10 contains an engine 12 for driving a gear reduction and clutch mechanism 14 to turn a relatively flexibly mounted rotor shaft 16 and a shaft 18 for driving a torque compensating tail rotor 20. The shaft 16 turns a hub 22 carrying upon pins 23 the sustaining rotor 24 comprising a blade portion 26, a shank portion 28 and a counterbalancing and damping mechanism generally indicated by the reference character 30.

Figure 2:
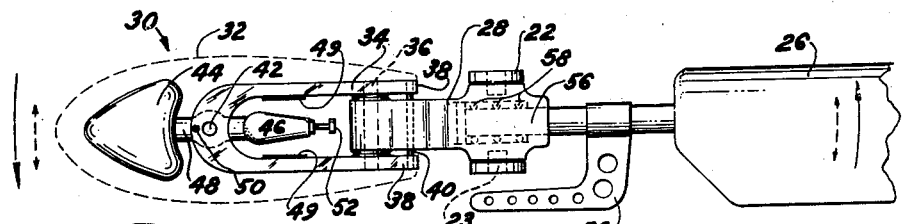
Fig. 2 is a detail plan view of the counterbalance damping mechanism.

In Fig. 2, the counterbalance mechanism 30 is shown as mounted within a fairing 32 and is made up of a counterweight support in the form of a yoke 34 mounted upon the shank portion 28 of the rotor mechanism 24 by a pin 36. The yoke 34 may be free to move up and down upon the pivot 36 between limit stops 38 and a pin 40. The yoke 34 carries a vertical pin 42 at its outermost end for mounting a counterweight mechanism comprising an outer weight 44, an inner weight 46 and a connecting bar 48. The weight 46 can move laterally between limit stops 49 made of rubber, or other shock absorbing material. The center of gravity of the weight system is located at a point 50 in the instant modification, which point is not in registry with the pivot 42. The position of the center of gravity can be adjusted by a lock bolt 52 which may be screwed in or out of the weight 46 to shift the position of the center of gravity 50. The entire counterweight mechanism 30 can move up and down around the pin 36 to provide resistance to up and down movement of blade 26 and to also provide dynamic damping for the flapping movements of the blade 26.

To control the total and cyclic pitch of the rotor blade 26, a control arm 54 is provided and connected to the root portion 56 of the shaft of the rotor blade 26. The root portion 56 is shown as mounted within ball races 58 which abut shoulders between the shank portion 28 and the root 56 of the blade shaft. Thus, as the arm 54 is moved up and down, the pitch, or angle of attack, of the blade 26 will be changed to vary the lift of the rotor blade 26. Although no means of control are shown, it will be understood that any known structure for changing the total and cyclic pitch of a rotor blade can be used in combination with the instant device.

Figure 4:
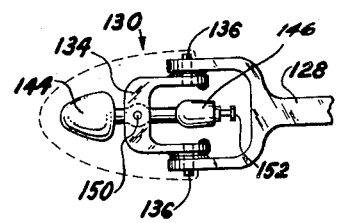
Fig. 4 is a view of a modification of the present invention.

In Fig. 4, a modification of the present invention is shown and comprises a rotor counterweighting and damping mechanism 130 mounted upon a shank portion 128 of a rotor, which shank portion is somewhat longer than that described above. The weights 144 and 146 are pivoted upon a vertical pin 150 carried by a short yoke 134 which is in turn mounted upon pins 136 carried by the shank 128. The center of gravity of the two weights is located at a point nearer the weight 144 than the weight 146. The position of the center of gravity can be changed by adjusting the position of the bolt 152.

Figure 3:
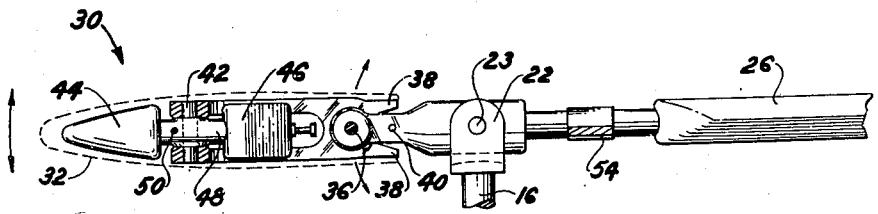
Fig. 3 is an elevation, partly in section, of Fig. 2.
Figure 5:
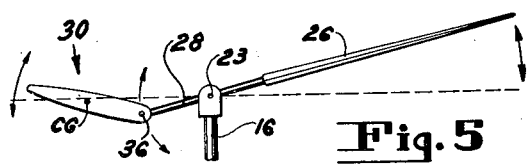
Fig. 5 is a diagrammatic view of that form of the invention shown in Figs. 1, 2 and 3 in an operative position.

For describing one mode of operation of that form of invention shown in Figs. 1, 2 and 3, reference is now made to Fig. 5. The rotor blade 26 is shown in an exaggerated coning position in which position it has flapped upwardly from the horizon line, for example. In this position, the pivot point 36 has been pulled downwardly by the blade shank 28. In this position, a restoring moment will be exerted by the mass of the counterweight mechanism, which moment will also resist any further movement. It will be noted that the center of gravity has moved below the horizon line. Thus, the direction of movement of the weight will be downward. Hence, as the blade 126 moves downward, it will be opposed and prevented from overshooting the horizon line by the resistance of the centrifugal force of the weights as well as because of the fact that the weight needs to be restored to a position in alignment with the horizon line out of which position it will be moving when the restoration action begins. Thus, the mechanism shown in Fig. 5 resists the flapping movement partly by inertia of the counterweight mechanism and also by a dynamic component of this inertia caused by flapping of the blade.

The instant mechanism also damps lagging and leading movements of the rotor blade as best disclosed in Fig. 2. The direction of rotation of the rotor blade 26 and the counterweight mechanism 30 is shown by solid line arrows. The lagging and leading movement is shown by dotted line arrows and it will be understood that this second motion is superposed upon the normal rotational movement of the rotor mechanism. As the forces acting upon the rotor blade 26 cause it to lag (move relatively clockwise with respect to its constant speed counterclockwise motion), the counterweight mechanism 30 will resist such motion with its inertia; but will be caused to rotate in a counterclockwise direction within limits defined by the stops 49. As the blade moves relatively in the opposite direction, the counterweight mechanism will resist this motion and will cause the weights 46 and 44 to rotate in a clockwise direction. However, due to the lagging and leading of the counterweights 44 and 46, this motion will be out of phase with the lagging and leading motion of the blade and will damp the same. The degree of damping may be controlled by adjusting the position of the center of gravity with respect to the pivot 42 and may be of high or low degree as desired dependent upon such position.

Figure 6:
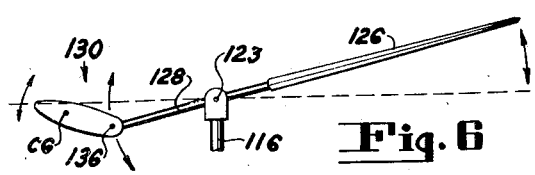
Fig. 6 is a view similar to Fig. 5 but of that form of the invention shown in Fig. 4.

In Fig. 6, that modification shown in Fig. 4 is represented in an active position. The blade 126 has flapped up from the horizon line and has moved the counterweight mechanism 130 downwardly and rotated the same in a direction opposite to the direction of rotation of the blade 126. Thus, the counterweight mechanism 130 will exert a force due to the centrifugal action to restore the blade 126 to the horizon line and also to restore itself to that position. However, as the blade 126 moves toward the horizon line, the direction of rotation of the counterweight mechanism 130 will be reversed, and hence will damp the action of the movement of blade 126 to prevent it from overshooting the horizon line.

While I have shown two forms of my invention which give different degrees of damping to the different movements or senses of movement of a rotor blade, it will be understood that many other modifications could be devised. For example, the different pivot points could be moved to different positions to provide no dynamic damping for the flapping movements if the pivots 36 or 136 were coincident with the pivots 23 or 123. The dynamic damping becomes greatest at a point between the location of the center of gravity of the counterweight damping mechanism 30 and 130 and the pivots 23 or 123. It would also be obvious to shift the center of gravity of the weight system by using different materials, or different sizes of weights, or different spacing of the several pivots or a different number of weights to obtain substantially the same or related functions.

Therefore, while I have shown two forms that my invention may take, I wish not to be limited only to such forms but by the scope of the following claims.

I claim:

1. In a helicopter, a drive shaft, a rotor hub turned by said shaft, a blade pivotally mounted on said hub for vertical movement having a shank portion, and means for counterbalancing and damping the vibrations of said blade comprising a counterweight support pivotally mounted on said shank portion on the opposite side of said shaft from said blade, and a counterweight pivotally mounted on said support, the pivotal axes of said support and said counterweight being angularly related to each other, whereby said support and said counterweight move in angularly related planes.

2. In a helicopter, a drive shaft, a rotor hub turned by said shaft, a blade pivotally mounted on said hub for flapping movement having a shank portion, a counterweight support pivotally mounted on said shank portion on the opposite side of said shaft from said blade for movement in the flapping plane of said blade, and a counterweight pivotally mounted on said support for movement in a plane angularly related to said flapping plane.

3. In a helicopter, a drive shaft, a rotor hub turned by said shaft, a blade mounted on said hub for flapping movement including a shank portion, a counterweight support mounted on said shank portion on the opposite side of said shaft from said blade for pivotal movement about a generally horizontal axis, and a counterweight mounted on said support for pivotal movement about a generally vertical axis.

4. In a helicopter, a drive shaft, a rotor head turned by said shaft, a blade mounted on said hub for flapping movement including a shank portion, a counterweight support pivotally mounted on said shank portion on the opposite side of said shaft from said blade on a generally horizontally disposed hinge pin, said support having a generally vertical hinge pin adjacent its free end, and a counterweight pivotally mounted on said vertical pin.

5. In a helicopter, a drive shaft, a rotor hub turned by said shaft, a blade mounted on said hub for flapping movement including a shank portion, a counterweight support mounted on said shank portion and disposed on the opposite side of said shaft from said blade, said support comprising a U-shaped yoke having its ends pivotally mounted for movement about a generally horizontal axis in said shank portion, and counterweight means mounted for pivotal movement about a vertical axis in the free end of said support.

6. In a helicopter, a drive shaft, a rotor hub turned by said shaft, a blade on said hub mounted for flapping movement including a shank portion, a counterweight support mounted on said shank portion and disposed on the opposite side of said shaft from said blade, said support comprising a U-shaped yoke having its ends mounted for pivotal movement on a generally horizontal hinge pin in said shank portion, counterweight means comprising two masses and means rigidly connecting said masses, a generally vertical hinge pin in the free end of said support and in said connecting means for pivotally mounting said counterweight means on said support with one of said masses disposed within said yoke.

7. In a helicopter, a drive shaft, a rotor hub turned by said shaft, a blade on said hub mounted for flapping movement including a shank portion, a counterweight support mounted on said shank portion and disposed on the opposite side of said shaft from said blade, said support comprising a U-shaped yoke having its ends mounted for pivotal movement on a generally horizontal hinge pin in said shank portion, counterweight means comprising two masses and means rigidly connecting said masses, a generally vertical hinge pin in the free end of said support and in said connecting means for pivotally mounting said counterweight means, one of said masses being smaller than the other and being disposed within said yoke, and adjusting means carried by one of said masses for varying the center of mass of said counterweight means.

8. In a helicopter, a drive shaft, a rotor hub turned by said shaft, a blade pivotally mounted on said hub for flapping movement including a shank portion, and means for counterbalancing and damping the vibrations of said blade comprising a counterweight support mounted on said shank portion for pivot movement about a generally horizontal axis, and a counterweight mounted on said support for pivotal movement about a generally vertical axis, said axes being differently spaced from the center of mass of said counterweight, whereby said counterweight vibrates about each of said axes at a different natural frequency.

9. In a helicopter, a drive shaft, a rotor hub turned by said shaft, a blade pivotally mounted on said hub for vertical movement including a shank portion, and means for counterbalancing and damping the vibrations of said blade comprising a counterweight support mounted on said shank portion for pivotal movement about a generally horizontal axis, and a counterweight mounted on said support for pivotal movement about a generally vertical axis, said counterweight comprising two members and a rigid connecting means for said members and said horizontal and vertical axes of pivotation being differently spaced from the center of mass of said counterweight.

10. In a helicopter, a drive shaft, a rotor hub turned by said shaft, a blade pivotally mounted on said hub for vertical movement including a shank portion, and means for counterbalancing and damping the vibrations of said blade comprising a counterweight support mounted on said shank portion for pivotal movement about a generally horizontal axis, and a counterweight mounted on said support for pivotal movement about a generally vertical axis, said counterweight means comprising two members of different mass and a rigid connecting means for said members and said horizontal and vertical axes being located at different distances from the center of mass of said combined members and their connecting means.

11. In a helicopter, a drive shaft, a rotor hub turned by said shaft, a blade pivotally mounted on said hub for flapping movement including a shank portion, and means mounted on the opposite side of said shaft from said blade for counterbalancing and damping the vibrations of said blade comprising a counterweight support pivoted to said shank portion on a generally horizontal axis, and a counterweight pivoted to said support on a generally vertical axis, the center of mass of said counterweight being differently spaced from said axes, whereby said counterweight vibrates at a different frequency about each axis, and means for varying the location of said center of mass relative to said axes.

GIFFORD I. HOLMES.

REFERENCES CITED

The following references are of record in the file of this patent:

UNITED STATES PATENTS

| Number | Name | Date |
| --- | --- | --- |
| 1,756,898 | Bocz | Apr. 29, 1930 |
| 1,969,077 | Howe | Aug. 7, 1934 |
| 2,048,326 | Dyer | July 21, 1936 |
| 2,242,457 | Cierva | May 20, 1941 |
| 2,247,034 | Pitcairn | June 24, 1941 |
| 2,297,815 | Tidd | Oct. 6, 1942 |
| 2,349,187 | Meyer | May 16, 1944 |
| 2,361,710 | Salomon | Oct. 31, 1944 |
| 2,370,880 | Rubissow | Mar. 6, 1945 |
| 2,383,516 | Salomon | Aug. 28, 1945 |

FOREIGN PATENTS

| Number | Country | Date |
| --- | --- | --- |
| 768,000 | France | May 7, 1934 |